US007848270B2

(12) United States Patent
Hilmersson

(10) Patent No.: US 7,848,270 B2
(45) Date of Patent: Dec. 7, 2010

(54) MINIMIZING ENERGY USAGE IN A WIRELESS PORTABLE UNIT BASED ON MOTION OF THE DEVICE

(75) Inventor: Jesper Hilmersson, Molndal (SE)

(73) Assignee: Ascom Tateco AB, Gothenburg (SE)

( * ) Notice: Subject to any disclaimer, the term of this patent is extended or adjusted under 35 U.S.C. 154(b) by 547 days.

(21) Appl. No.: 11/409,958

(22) Filed: Apr. 25, 2006

(65) Prior Publication Data

US 2006/0245385 A1 Nov. 2, 2006

(30) Foreign Application Priority Data

Apr. 28, 2005 (SE) .................................... 0500947

(51) Int. Cl.
*H04W 4/02* (2009.01)
*H04W 24/00* (2009.01)
*H04W 4/00* (2009.01)
*H04W 36/00* (2009.01)
*H04B 1/38* (2006.01)

(52) U.S. Cl. ....................... 370/311; 370/331; 455/574; 455/456.6; 455/432.1; 455/441

(58) Field of Classification Search ................. 370/311; 455/522, 456.6, 574
See application file for complete search history.

(56) References Cited

U.S. PATENT DOCUMENTS 5,924,043 A * 7/1999 Takano ....................... 455/522
6,167,268 A * 12/2000 Souissi et al. ............ 455/456.1
2002/0142773 A1* 10/2002 Rudrapatna et al. ......... 455/522
2003/0036389 A1* 2/2003 Yen ........................... 455/456
2003/0119504 A1* 6/2003 Rankin ....................... 455/574
2004/0072556 A1* 4/2004 Frantti et al. ................ 455/522
2004/0110524 A1* 6/2004 Takano et al. ............... 455/522
2004/0192347 A1* 9/2004 Leizerovich et al. ..... 455/456.1
2004/0204184 A1* 10/2004 Lin ............................ 455/574
2005/0068169 A1* 3/2005 Copley et al. ............ 455/456.1
2005/0079886 A1* 4/2005 Niwano ...................... 455/522
2007/0115883 A1* 5/2007 Narayanan et al. .......... 370/331

FOREIGN PATENT DOCUMENTS

EP 0 812 119 A2 12/1997
WO WO 9967899 A1 * 12/1999

* cited by examiner

*Primary Examiner*—Nick Corsaro
*Assistant Examiner*—Tangela T. Chambers
(74) *Attorney, Agent, or Firm*—Birch, Stewart, Kolasch & Birch, LLP

(57) ABSTRACT

A method for minimizing energy usage in a portable unit in a wireless communications system incorporates means to locally generate information on motion of the portable unit and to adapt a transmission from the portable unit based upon such motion information so that energy usage is minimized. By applying this method, information concerning motion of the portable unit is utilized in order to adapt transmissions from the portable unit in such a way that less energy is consumed. In the case of a portable telephone, connection time is thereby primarily increased, because it is then that most energy is used for transmission. In many cases standby time is also increased because many telephones also transmit information during standby, for example during so-called roaming.

18 Claims, 2 Drawing Sheets

MINIMIZING ENERGY USAGE IN A WIRELESS PORTABLE UNIT BASED ON MOTION OF THE DEVICE

RELATED APPLICATION

This application claims priority under 35 U.S.C. §119(a) to Swedish application No. 0500947-7 filed Apr. 28, 2005, the entire contents of which are incorporated by reference herein.

TECHNICAL AREA

The present invention relates to a method of minimizing energy usage in a portable unit in a wireless communications system. The invention also relates to a portable unit for use in a wireless network and a system having a plurality of such portable units.

Aspects of the present invention are especially applicable in wireless telephony systems that utilize Wireless Local Area Network (WLAN) communication, but are also applicable in other cellular mobile telephone networks such as Global System for Mobile Communications (GSM), Universal Mobile Telecommunications System (UMTS), or Digital Enhanced Cordless Telecommunications (DECT) types.

TECHNICAL BACKGROUND

Improvement of the battery capacity of portable units has long been a priority area of development. For example, the battery capacity of mobile telephones has steadily increased since the first units appeared on the market and it is currently common to have standby times of several hundred hours.

However, the connection time is often significantly less, simply because the various energy-saving methods and solutions that have hitherto been implemented primarily affect the standby time. Satisfactory methods are still lacking for minimizing the energy requirement when connected, that is, during periods in which the unit is transmitting. There is still generally a continually increasing requirement for longer stand by time.

SUMMARY OF THE INVENTION

One goal of the present invention is therefore to minimize the energy requirements in a portable unit of a wireless communications system, both during standby as well as during periods when the portable unit is transmitting. A further goal is to increase the time between required charging of the portable unit.

These and other goals are achieved by embodiments of the present invention. In one aspect, the present invention is a method for controlling energy usage in a portable unit in a wireless communications system, the method comprising: locally generating information on the motion of the portable unit; and adapting a transmission from the portable unit based on such information so that energy usage is reduced.

In this context, "local" refers to information generated at the same place that the portable unit is located, for example, by means of a motion detector that is provided in or in conjunction with the portable unit.

By applying this method, information on motion of the portable unit is thus utilized to adapt transmissions from the portable unit in such a way that less energy is consumed. In the case of a portable telephone, the connection time is thereby primarily increased since it is there that most energy is used for transmission; but in many cases the standby time is also increased because many telephones transmit information during standby, for example, during so-called roaming.

The information can indicate at least one or more of the following: whether the portable unit is at rest or in motion; the direction in which movement of the portable unit is taking place; the velocity at which movement of the portable unit is taking place; how far along a path the portable unit has covered since the previous transmission; and in which direction the portable unit has been moved since the previous transmission.

The information can, for example, be used in order to estimate the current distance to the nearest base station, whether the portable unit is moving toward or away from the base station currently in use, or if the portable unit is moving to a higher location.

Adapting the transmission can include regulating the output power of the portable unit, for example, depending upon the distance to the base station in use. By adapting the output power in this way, energy usage can be decreased.

Adapting the transmission of the portable unit can also include completely terminating an ongoing transmission. For example, scheduled roaming activity can be postponed if the portable unit has been moved less than a predetermined distance since the previous roaming activity. Roaming, which normally uses a great deal of energy from a portable telephone in the standby mode, is thereby completely inactivated as long as the telephone remains fixed. This significantly increases the standby time.

This is particularly advantageous in a WLAN, where the base stations typically have a smaller area of coverage than in a GSM network, for example, and roaming therefore takes place more often. It is further particularly advantageous in unsynchronized networks such as WLAN, since the roaming procedure in such a network takes longer and uses more energy. In synchronized networks, for example GSM, roaming procedures can be kept shorter.

Under ongoing signal traffic, monitoring of current transmission parameters can be postponed if a portable unit has been moved less than a predetermined distance since the parameters were last determined. Examples of conceivable parameters are output power and current base station. The canceled monitoring saves energy during ongoing signal traffic and thereby increases connection time (as well as standby time) in a telephone.

Another aspect of the present invention concerns a portable unit incorporating a motion detector for detecting of motion of the portable unit, together with a controller for adapting a transmission from the portable unit based on such information in order to decrease energy usage in the unit.

The portable unit can be adapted to implement the method in accordance with the primary aspect of the invention.

The motion detector can be arranged to detect motion on its own account, for example, an accelerometer, but may also be arranged so that motion is detected through contact with the wireless network.

A third aspect of the invention concerns a wireless network containing at least one base station and a plurality of portable units in accordance with the other aspects of the invention.

BRIEF DESCRIPTION OF THE DRAWINGS

The current invention will be described more particularly below with reference to the attached drawings, which in an exemplary manner illustrate the currently preferred embodiment.

DETAILED DESCRIPTION OF PREFERRED EMBODIMENTS

The following description refers to cellular network, for example, a WLAN (Wireless Local Area Network). However, the invention can advantageously be applied in other cellular Networks as will, such as a Time Division Multiple Access (TDMA) based network of the new Global System for Mobile Communications (GSM) or Digital Enhanced Cordless Telecommunications (DECT) type, or a Code Division Multiple Access (CDMA) based network, as well as in a non-cellular network.

Figure 1:
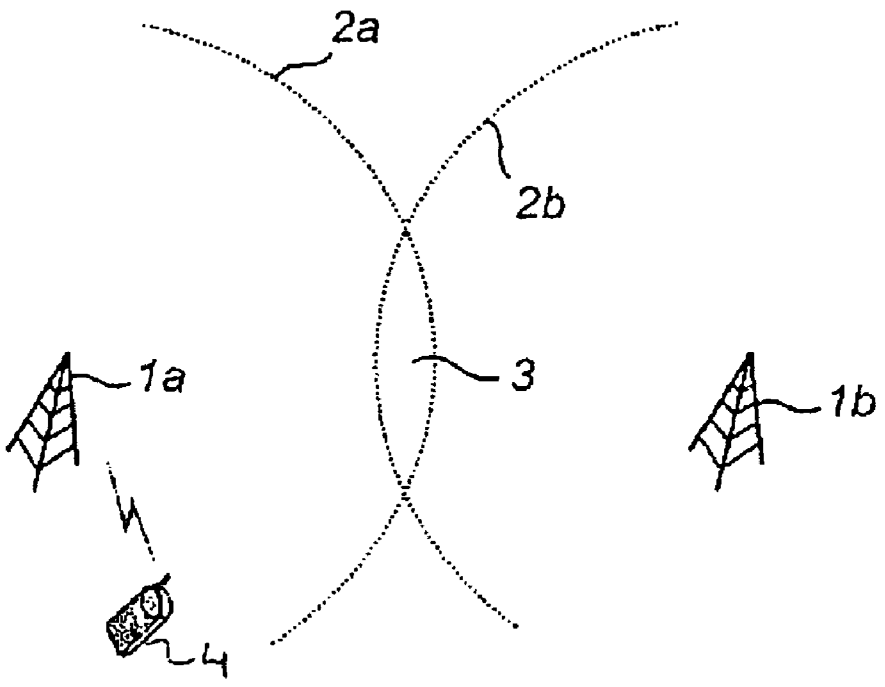
FIG. 1 shows a wireless network and an embodiment of a portable telephone in accordance with an embodiment of the present invention.

FIG. 1 illustrates a cellular network with two base stations 1*a*, 1*b*, each with a coverage area 2*a*, 2*b*. The coverage areas of base stations 1*a* and 1*b* can overlap in the region 3. A portable telephone 4 is in wireless contact with one of the base stations, which is base station 1*a* in the illustration of FIG. 1. The network in this embodiment is a WLAN, but wireless contact could alternatively take place in accordance with any other suitable standard, such as CDMA or TDMA, depending upon the application. The portable telephone 4 is furthermore equipped to communicate with the appropriate base station, depending upon where it is located.

In the example shown in FIG. 1, portable telephone 4 communicates via base station 1*a* as long as it is located within coverage area 2*a* and transitions to communicating with base station 1*b* when it enters into coverage area 2*b*. The technology of continually monitoring which base station the portable unit can best communicate with is called "roaming," and this makes it possible for a user to move around within a large region without any interruption of service.

Base stations 1*a*, 1*b* in a WLAN are unsynchronized and have relatively small coverage areas. This implies that portable telephone 4 frequently needs to change base stations and roaming therefore occurs often. Since the base stations 1*a*, 1*b* are completely unsynchronized, the roaming process is longer than in a network with synchronized base stations (e.g., GSM type). In other words, roaming results in a relatively large amount of energy consumption in a WLAN.

Figure 2:
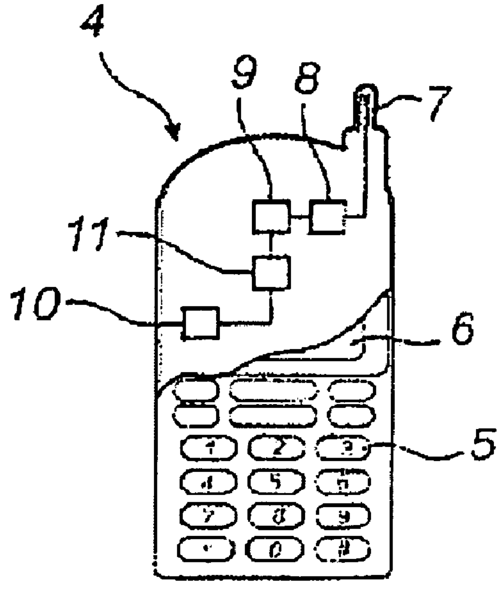
FIG. 2 shows the portable telephone in FIG. 1 in more detail in accordance with an embodiment of the present invention.

Portable telephone 4, which is shown in more detail in FIG. 2, includes known elements, including a set of buttons 5, a display 6, an antenna 7, a transmit/receive unit 8 for transmitting and receiving speech and coded data in the form of electromagnetic waves by means of the antenna 7, and control circuitry 9 for managing communications with the base stations in the network. This management includes control of which base station the portable telephone is to communicate with at any given moment. This control implies that the portable telephone regularly queries whether it can receive signals from more than one base station during ongoing transmission/reception (and during inactive periods as well), and, in this case, which of these stations provides the best signal. In the exemplary embodiment illustrated, the control circuitry 9 is adapted for WLAN communications.

The portable telephone 4 further incorporates a motion detector 10, which detects position and motion of the telephone. Such a motion detector is already currently incorporated into certain telephones, for example, in combination with a personal alarm. Motion detector 10 is, in the illustrated embodiment of the invention, also connected to a control unit 11, which is adapted to receive information on movement of the portable telephone 4 and to operate control circuitry 9 and transmit/receive unit 8 in order to adapt transmissions from the telephone depending upon the motion of the portable telephone. Control unit 11 can be implemented in hardware and/or software and can be implemented by reprogramming hardware already present in the portable telephone.

Several other adaptations may be advantageous depending upon the detection of motion and the situation at hand.

A special type of transmission applies to roaming activities, that is, brief messages regularly transmitted from the portable telephone in the standby mode in order to determine which base stations are in the vicinity. The roaming activities can be scheduled at intervals of 5 minutes. The base station that returns the strongest signal is selected as the operating base station. Scheduled roaming activities, which affect energy usage, can be inactivated as long as the portable telephone is at rest or is moved less than a predetermined distance.

Figure 3:
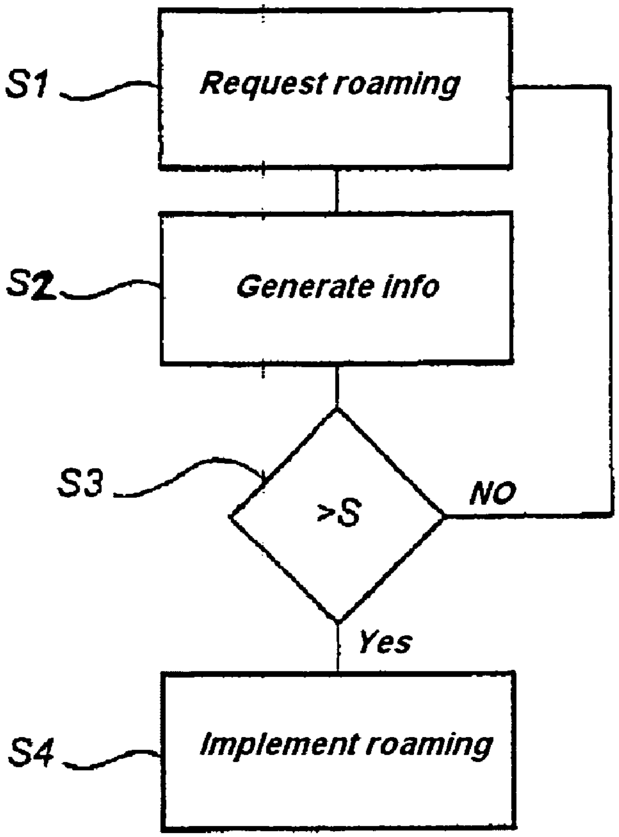
FIG. 3 and FIG. 4 show a flow diagram illustrating embodiments of a method in accordance with principles of the present invention.

FIG. 3 illustrates roaming in accordance with one embodiment of the invention. In step S1, a scheduled roaming activity is activated. In step S2, information is generated by motion detector 10 concerning possible motion of the portable telephone 4. In step S3, control unit 11 determines whether the portable telephone 4 has been moved farther than a predetermined distance, S, in which case program control continues to step S4, were roaming is carried out. If the portable telephone 4 has not moved father than distance S since the previous roaming activity, program control returns to step S1, awaiting the next scheduled roaming activity. Distance S is such that movements that are shorter than this distance are assumed not to require change of the current base station.

Roaming also takes place during transmission, but in this case the ongoing signal traffic is utilized. Ordinarily, messages to the portable telephone 4 are transmitted from several different base stations (with different coding), and control circuitry 9 continually determines which signal is strongest. This functionality, which naturally also affects energy usage, can be deactivated as long as the portable telephone 4 is at rest or is moved less than a predetermined distance.

During ongoing signal traffic, transmission ordinarily takes place from the portable telephone 4 with an output power that is adjusted in accordance with the current situation. For example, it may happen that the transmission takes place at first with an output power that is relatively strong and that is gradually reduced. By means of the control signal from the base station, a determination can be made of the lowest power at which transmission can take place with acceptable quality. Once again, this functionality, which naturally also affects energy usage, can be deactivated as long as the portable telephone 4 is at rest or is moved less than a predetermined distance.

Information on motion can also be utilized to predict changes in required power. For example, if the portable telephone 4 is moved in a direction toward a base station, the output power can probably be decreased. The same holds true if the portable telephone 4 is moved upward, that is, to a position at a higher altitude, at which it probably would have a better "view" of the closest base station.

Figure 4:
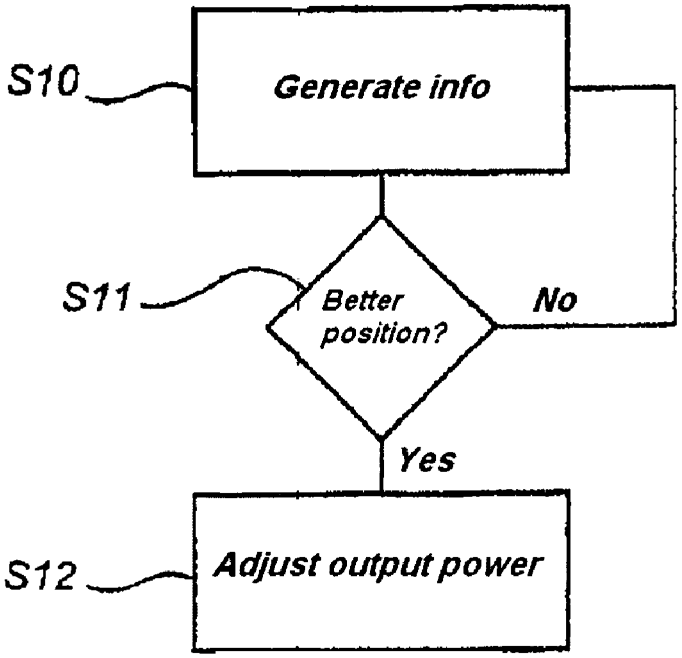

Such an adjustment of output power is shown schematically in FIG. 4. In step S10, information is generated concerning motion by means of motion detector 10. In step S11, a determination is made in control unit 11 as to whether this information indicates a likely better transmission condition relative to the current base station (closer, higher up, etc.). If this is determined to be the case, adjustment of output power takes place in S12, in which control unit 11 regulates control circuitry 9 that manages transmission from transmitter/receiver 8.

One skilled in the art will understand that a series of other variations and modifications on the above-described embodiments are possible within the framework of the attached patent claims. For example, the portable unit does not have to be a telephone, but can just as well be a portable computer, PDA, or the like which utilizes a wireless network as does a portable telephone. Even though the embodiment described utilizes a cellular network, the invention can also be applied in a network with one single base station.

I claim:

1. A method for controlling energy usage in a portable unit in a wireless communications system, the portable unit performing a roaming activity according to a schedule at a periodic interval, said method comprising:

locally generating information on motion of the portable unit, and estimating a distance since a previous roaming activity based on a speed of movement of the portable unit as the locally generated information;

adapting a transmission from the portable unit based on such motion information so that energy usage is reduced, deactivating the roaming activity at each interval period that the motion information indicates that the portable unit remains within a predetermined distance from the previous roaming activity.

2. The method in accordance with claim 1, wherein said motion information indicates at least one or more of: whether the portable unit is at rest or motion; in which direction movement of the portable unit is taking place; at what velocity any motion of the portable unit is taking place; how far the portable unit has been moved since the previous transmission; and in which direction the portable unit moved since the previous transmission.

3. The method in accordance with claim 1, wherein said transmission is adjusted by controlling output power for the portable unit.

4. The method in accordance with claim 3, wherein the output power is decreased if said motion information indicates that the portable unit is located closer to the base station than at the previous transmission.

5. The method in accordance with claim 1, wherein said transmission is deactivated entirely.

6. The method in accordance with claim 1, wherein monitoring of an ongoing transmission parameter is deactivated as long as the motion information indicates that the portable unit remains within a predetermined distance since the parameter was previously determined.

7. A portable unit for use in a wireless communication system incorporating a motion detector for detecting motion of the portable unit, said portable unit comprising:

a control unit for scheduling a roaming activity according to a schedule at a predetermined interval, estimating a distance that the portable unit has moved since a previous roaming activity based on a speed of the motion detected by the motion detector, controlling a transmission from the portable unit based upon results of motion detection in order to reduce energy usage in the portable unit, and for deactivating the roaming activity at each interval period that the detected motion indicates that the portable unit remains within a predetermined distance from previous roaming activity.

8. The portable unit in accordance with claim 7, wherein said control unit is adapted to control output power for the portable unit.

9. The portable unit in accordance with claim 7, wherein said control unit is adapted to control a transmission time in the portable unit.

10. The portable unit in accordance with claim 7, wherein said motion detector incorporates an accelerometer.

11. A wireless communications system incorporating at least one base station and a plurality of portable units, each portable unit in accordance with claim 7.

12. The wireless communications system in accordance with claim 11, wherein said portable units and base station are disposed to communicate via wireless local area network connections.

13. A computer program product, comprising a computer usable medium incorporating computer readable program code, said computer readable program code adapted to control energy usage in a portable unit in a wireless communications system, the computer readable program code being adapted to control energy usage in a portable unit in a wireless communications system by executing a method comprising:

locally generating information on the motion of the portable unit and estimating a distance from a previous roaming activity based on a speed of movement of the portable unit as the locally generated information;

performing a roaming activity according to a schedule at a predetermined interval;

adapting a transmission from the portable unit based on such motion information so that energy usage is reduced; and deactivating the roaming activity at each interval period that the motion information indicates that the portable unit remains within a predetermined distance from the previous roaming activity.

14. The computer program product in accordance with claim 13, wherein said motion information indicates at least one or more of: whether the portable unit is at rest or motion; in which direction movement of the portable unit is taking place; at what velocity any motion of the portable unit is taking place; how far the portable unit has been moved since the previous transmission; and in which direction the portable unit moved since the previous transmission.

15. The computer program product in accordance with claim 13, wherein said transmission is adjusted by controlling output power for the portable unit.

16. The computer program product in accordance with claim 15, wherein the output power is decreased if said motion information indicates that the portable unit is located closer to the base station than at the previous transmission.

17. The computer program product in accordance with claim 13, wherein said transmission is deactivated entirely.

18. The computer program product in accordance with claim 13, wherein monitoring of an ongoing transmission parameter is deactivated as long as the motion information indicates that the portable unit remains within a predetermined distance since the parameter was previously determined.

* * * * *